305 SR Search Roo
OR RE 20,142

Oct. 27, 1936. C. P. BOUCHER Re. 20,142

ELECTRICAL SYSTEM AND APPARATUS Orig. 2017,273

Original Filed March 12, 1934 2 Sheets-Sheet 1

Inventor:
Charles P. Boucher,
by John Howard Joyce
His Atty.

Search Re

ELECTRICAL SYSTEM AND APPARATUS

Original Filed March 12, 1934 2 Sheets-Sheet 2

Inventor:
Charles P. Boucher,
by John Howard Joynt
His Atty.

Search R

Re. 20,142

UNITED STATES PATENT OFFICE 20,142

ELECTRICAL SYSTEM AND APPARATUS

Charles P. Boucher, Montreal, Quebec, Canada, assignor of one-half to Lovell G. Mickles, Montreal, Quebec, Canada Original No. 2,017,273, dated October 15, 1935, Serial No. 715,225, March 12, 1934. Application for reissue May 13, 1936, Serial No. 79,585

18 Claims. (Cl. 171—119)

This application is a continuation in part of my Patent No. 1,950,395 granted March 13, 1934 and entitled "Means for operating gas filled luminescent tubes", which in turn is a continuation in part of my Patent No. 1.950,394 granted March 13, 1934 and entitled, "Electric operating device for neon and like signs".

This invention relates to electical systems and apparatus and more particularly to electrical systems including loads having negative electrical resistance characteristics, especially luminescent tube systems and apparatus for operating the same.

One of the objects of my invention is the provision of a simple, economical and thoroughly reliable system and apparatus for the inexpensive and highly efficient operation of a plurality of loads having negative electrical resistance characteristics, such as for example, luminescent tubes or gaseous conduction devices of various shapes and sizes comprising for example, a luminous display.

Another object is the achievement of clear and brilliant operation of luminescent tubes or gaseous conduction devices of the character indicated with a minimum of expensive and/or cumbersome equipment, all at a desired high power factor and good operating efficiency.

Another object is the provision of inexpensive and compact electrical apparatus for uniformly operating, from a readily available source of alternating current electrical energy, a plurality of individual loads having negative electrical resistance characteristics, such as luminescent tubes wherein the several loads continuously vary in character because of various individual differences between the loads resulting, for luminescent tubes, from differences in the lengths of the tubes, differences in the sectional areas of the tubes, differences in the nature and pressures of the gases filling the tubes and other physical differences which affect the electrical characteristics, such as the striking potential, the cut-off potential and the current carrying capacity of the tubes employed.

A still further object of my invention is the provision of electrical transformer apparatus which is simple, compact and inexpensive in construction, which readily lends itself to rapid and inexpensive installation, and which is well adapted to withstand various conditions of load, overload and short-circuit encountered in use with a minimum of injury to the transformer and consequent necessity for replacement and/or repair, all with minimum variation in the energy supplied any one load by variations in the energy drawn by any other load.

Other objects in part will be obvious and in part pointed out hereinafter.

The invention accordingly consists in the various combinations of elements, features of construction and arrangements of parts, as described herein and the scope of the application of which is indicated in the following claims.

Figure 1:
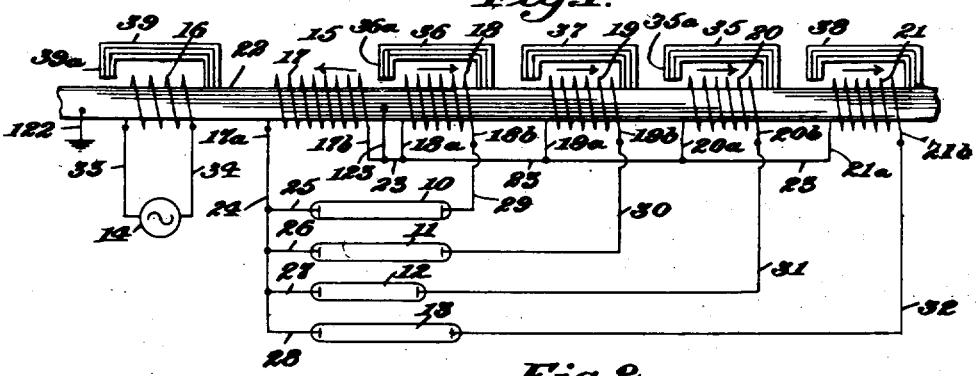

In the accompanying drawings Figure 1 is a diagrammatic representation of my system and apparatus for operating a number of luminescent tubes comprising a single luminous display.

Figure 2:
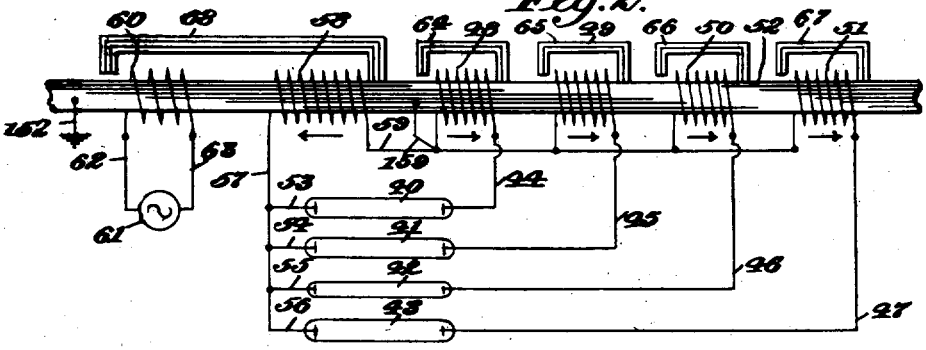
Figure 3:
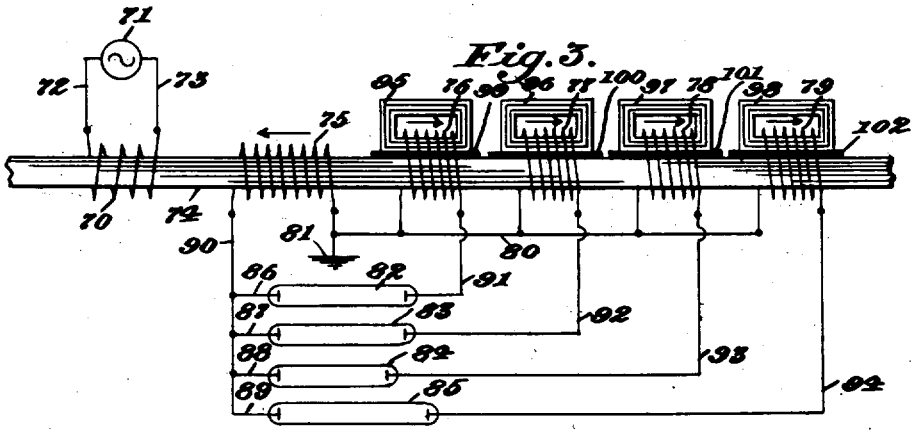
Figure 4:
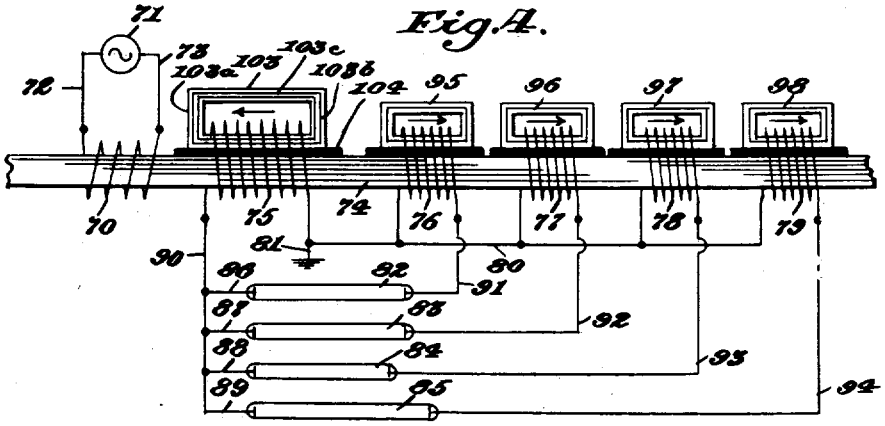
Figure 5:
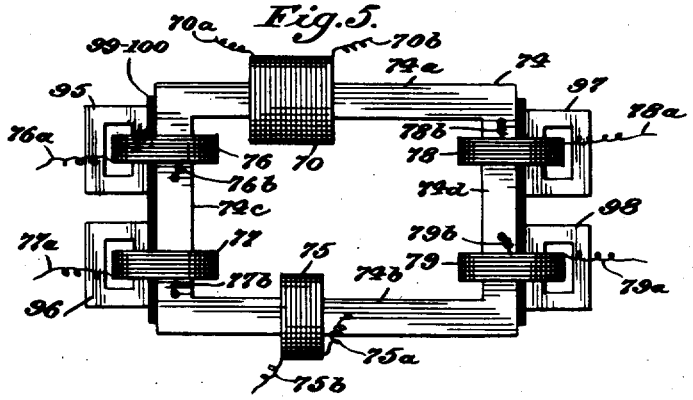
Figure 6:
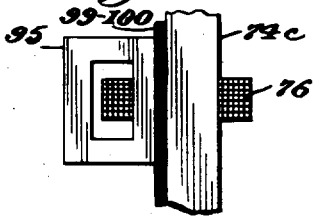

Figures 2, 3 and 4 are diagrammatic representations of modified systems and apparatus for operating a number of luminescent tubes conprising a single luminous display unit, Figure 5 is a diagrammatic representation of my transformer apparatus as employed in the system indicated in Figure 3, and Figure 6 is a detached diagrammatic sectional view on an enlarged scale of a part of my transformer apparatus shown in Figure 5.

As conducive to a clearer understanding of certain features of my invention, it may be noted at this point that in the operation of a number of devices having negative electrical resistance characteristics, such as a number of luminescent-gas filled tubes comprising a single luminous sign or display, certain practical difficulties in operation are encountered, because of the inherent unstable operating characteristics of the individual tubes or devices.

In operating such devices from a source of alternating current electrical energy, the instantaneous resistance of any one tube or device varies greatly from the time when the instantaneous value of the applied potential is insufficient to cause an ionized conditioned of the contained gas (during which the tube is of high electrical resistance, is non-conductive and is non-luminous) and when the applied potential in either of the alternatively positive or negative portion has risen to such a value as to ionize the contained gas and to cause the tube to become a conductor of very low resistance and luminescence. Where the ionized, and hence conductive, condition of any one tube is established a substantial current flows through the tube until the continuously changing applied potential has fallen to such a low value that the ionized condition of the tube may be maintained no longer. At this time the tube again becomes non-conductive and non-luminous and remains so until the instantaneous value of the applied potential again rises, in following through the cycle of alternations, to a point sufficiently high to again cause the gas to become ionized, conductive and luminous.

The amount of light energy produced per unit time by any one luminescent tube of the character indicated, depends, first, upon the proportionate length of time that the tube is rendered conductive (the proportionate period between the time when the instantaneous applied potential becomes sufficient to ionize the gas contained in the tube and the time when this potential falls to such a low value that the ionized condition may be no longer maintained) and, second, upon the average brilliancy of operation of the tube throughout this conductive period, which is dependent upon the average current density within the tube, a factor which is directly influenced by the impedance of the circuit supplying the tube with electrical energy.

Likewise, it may be noted that in the operation of a number of devices or tubes of the character indicated, a number of practical difficulties are encountered because of unavoidable differences in the electrical characteristics of the several tubes or devices. Because of certain necessary differences in the physical characteristics of the tubes, such as differences in the lengths of the tubes, the tube diameters, the nature of the contained gases employed and the pressures of these gases, the electrical characteristics of several tubes are of necessity considerably different. Thus, because of these physical differences these several tubes have different striking or ionizing potentials, different potentials at which the ionization may be no longer maintained, different electrical conductance (or resistance) during the ionized conductive period and the like.

Since, as more particularly indicated above, the resistance of any one of the devices or gas-filled tubes of a single luminous display varies greatly from the un-ionized, non-conductive condition of the gas (where the electrical resistance is very high) to the ionized, conductive condition (where the resistance is very low), a characteristic which renders the tube inherently unstable, it is particularly difficult to operate more than one of these tubes or devices in a reliable manner.

In heretofore known and/or used systems and apparatus for operating a plurality of devices having negative resistance characteristics, such as a plurality of gas-filled luminescent tubes comprising a single luminous display, great difficulty is experienced in achieving uniform, stable operation of the tubes or devices. Likewise, considerable difficulty in the operation of such systems is experienced because of the exceedingly high operating potentials required to strike or effect an ionized condition of the tubes rendering a series operation of the tubes or devices impracticable commercially because of the objectionably high potentials thus necessarily encountered.

In heretofore known systems of the character indicated the several devices or tubes employed, because of the inherent instability, the high striking potentials and varied individual electrical characteristics of these tubes or devices, as more particularly indicated above, are either energized from individual sources of high potential alternating current electrical energy or supplied with energy from the various phases of a polyphase electrical system, or excited from separate high potential electrical transformer apparatus connected with a single source of electrical energy. All of these systems and apparatus are inefficient, expensive and cumbersome and costly to maintain and operate.

Accordingly, one of the outstanding objects of my invention is to provide a system and apparatus of a simple, compact and inexpensive construction for operating a number of high potential tubes or devices of the character described above, in an efficient, economical and thoroughly reliable manner, encountering electrical potentials within a prescribed maximum limit, from a readily available source of alternating current electrical energy to achieve a uniform brilliant display (for a plurality of luminescent tubes) of a desired character.

Referring now more particularly to the practice of my invention, attention is directed to Figure 1 of the drawings, wherein a plurality of devices having negative electrical resistance characteristics, illustratively a plurality of luminescent gas-filled tubes 10, 11, 12 and 13, are suitably mounted in a desired arrangement comprising a luminous display or sign 10—11—12—13. The devices or tubes 10, 11, 12 and 13 have approximately the same current ratings but have slightly different ratings in starting potentials. Thus, for example, the striking potentials of the several luminescent tubes are approximately proportional to the relative lengths of the tubes, and as indicated in Figure 1, the shorter tube 12 is of the lowest striking potential and the striking potentials of the remaining tubes are in the order 10, 11 and 13.

The several luminescent tubes, as more fully described in my Patent No. 1,950,394 referred to above, preferably comprise elongated clear glass envelopes having sealed-in electrodes at opposite ends. These envelopes are filled with one or more gases at low pressures, neon for example, having the property of becoming luminescent upon being electrically excited. For each luminescent gas-filled tube, as the column of gas contained within the glass envelope is subjected to succcessive high values of electrical potentials applied across the tube electrodes in a manner more particularly described hereinafter, the column of gas becomes ionized and the tube, formerly non-conductive, is rendered conductive permitting the flow of an electrical current through the ionized gas and the emission of a luminous glow, which for neon is red orange in color. The brilliancy or intensity of this color, as more particularly indicated above, is dependent largely upon the current density within the column of ionized gas. For low current densities (where the flow of current is greatly limited by the impedance of the electrical circuit supplying a luminescent tube, for example) the blow is weak and poorly distributed along the length of the tube; for reasonably high current densities, however, the tube gives forth a luminescent, brilliant glow which is well distributed along the entire length of the tube. For maximum efficient luminescence sustained high current densities are desired for a maximum proportion of the successive periods (corresponding to the alternations of the source of electrical supply energy) during which the tubes are rendered conductive, all as more particularly indicated above. Due however, to the inherently unstable characteristics of the devices or tubes of the character indicated, special precautions are taken to assure a substantially even, sustained flow of current which is sufficient to give a desired uniformly high current density in the several luminescent tubes comprising the luminous display and yet which is insufficient to burn out or otherwise Search damage the various tubes and the associated supply system and apparatus, all as more particularly described hereinafter.

Referring now back to Figure 1, the several luminescent tubes 10, 11, 12 and 13 are preferably supplied with alternating current electrical energy from a readily available single phase source 14, illustratively 220 volts at 60 cycles per second, which is connected to the luminescent tubes by way of electrical apparatus, generally indicated at 15 and more fully described below.

In accordance with the provisions of my invention electrical apparatus 15 includes a primary transformer winding 16 and secondary windings, illustratively five, 17, 18, 19, 20 and 21 mounted upon a common core 22; the total number of secondary winding coil sections being greater by one than the total number of the devices of negative electrical resistance characteristics, illustratively four, supplied with electrical energy. In order that luminescent tubes 10, 11, 12 and 13 of maximum lengths and maximum potential ratings may be employed with an electrical transformer apparatus of a specified maximum permissible potential to ground, each luminescent tube is supplied with the high potential electrical energy of two of the transformer secondary winding coil sections connected in series. Each of these coil sections, then, is rated at about one-half the maximum potential required to operate the tube, illustratively 13, of maximum potential rating. For reasons of simplicity and economy in construction, the several coil sections 17, 18, 19, 20 and 21 are preferably of like size and voltage ratings, although as will appear more fully hereinafter, the coil section 17 may be of a current carrying capacity of about four times that of coil sections 18, 19, 20 and 21; the current carrying capacities of coil sections 18, 19, 20 and 21 being reduced to effect a saving in copper where desired.

One end of each of the transformer secondary winding coil sections 17, 18, 19, 20 and 21 is connected to a conductor 23 thereby establishing a point of common potential. For example, as seen in Figure 1, the left ends 18*a*, 19*a*, 20*a* and 21*a* of the respective coil sections 18, 19, 20 and 21 and the right end 17*b* of coil section 17 are all connected to the common conductor 23, thus establishing a point of common potential and placing coil section 17 in opposed phase sequence to the coil sections 18, 19, 20 and 21 of like phase sequence, as diagrammatically indicated by the arrows placed immediately above the coil sections.

Savings in insulation are achieved, as well as a certain reliability of operation of the transformer as more particularly described hereinafter, by placing the common conductor 23 at the potential of core 22 by way of a suitable conductor 123. For reasons of general reliability in operation as well as safety in use, transformer core 22 is preferably connected to ground as generally indicated at 122.

In order that full electrical potential may be applied across the terminals of the several devices of negative electrical resistance characteristics the free end of the coil section 17 of opposed phase sequence, illustratively the left coil end 17*a*, as seen in Figure 1, is connected to an output terminal conductor 24, connected by way of conductors 25, 26, 27 and 28 to the respective devices 10, 11, 12 and 13, and the free ends of coil sections 18, 19, 20 and 21, illustratively the right coil ends 18*b*, 19*b*, 20*b* and 21*b* respectively are connected to the respective output terminal conductors 29, 30, 31 and 32 connected to the respective devices 10, 11, 12 and 13.

The several devices or tubes 10, 11, 12 and 13 are supplied with electrical energy by secondary winding coil section 17 in combination with coil sections 18, 19, 20 and 21 respectively; the potential of the electrical energy supplied these several devices being equal to the sum of the potential of coil section 17 and the respective potentials of coil sections 18, 19, 20 and 21.

In the operation of my electrical system and apparatus alternating current electrical energy from source 14 is supplied the primary winding 16 of my transformer apparatus by way of conductors 33 and 34, thereby establishing an alternating magnetic flux in transformer core 22. The alternating magnetic flux interlinks transformer secondary winding coil sections 17, 18, 19, 20 and 21 with primary winding 16; the alternations of this flux establishing a high value of output potentials across the coil ends of the several secondary winding coil sections.

As high potential electrical energy is supplied the various devices or luminescent tubes, all as more particularly described above, these tubes become conductive, and hence luminescent, when the instantaneous values of the various applied potentials become sufficient to establish an ionized condition within the respective tubes. Because of the lower striking potential of one of the tubes, illustratively tube 12, as indicated above, the gas of this tube becomes ionized, the tube is rendered conductive and a current begins to flow starting, for example from coil section 17 by way of coil end 17*a*, conductors 24 and 27 through tube 12 and by way of conductor 31, coil end 20*b*, coil 20, coil end 20*a*, conductor 23 and coil end 17*b* back to coil 17. This current renders the tube luminescent.

In order to prevent the current flowing in this tube from rising to an objectionably high value when the resistance of the tube (sufficiently high for the un-ionized, non-conductive condition of the tube) drops to an exceedingly low value (when the tube is ionized) an individual auxiliary core section 35 in the form of a magnetic shunt is mounted on core 22 in any suitable fashion embracing secondary winding coil section 20. The auxiliary core section 35, however, is preferably so mounted on the main core 22 as to provide a short air gap between one end 35*a*, of the auxiliary core section or shunt 35 and core 22 to create a magnetic shunt path of relatively high reluctance so that under substantially no load conditions (conditions existing for the initial portion of each half cycle of the alternating current electrical energy, and thus for the magnetic flux interlinking the transformer primary winding and the secondary winding coil sections) substantially all of the magnetic flux linking primary winding 16 also links coil sections 17 and 20 to give maximum output potential across the respective terminal conductors 24 and 31 and thus impress a full value of the instantaneous potential across the terminals of tube 12.

It will be noted that auxiliary core section 35 at least extends half-way around coil section 20 or half-way links this coil section. This auxiliary core piece, or portion of the transformer core, is conveniently C-shaped thereby, with the portion of core section 22 threading coil section 20, substantially completely linking this coil section. To conserve magnetic core material, provide a transformer of minimum stray magnetic fields and consequent freedom of mutual reactance between the various transformer secondary winding coil sections, the various auxiliary core pieces are in intimate relation with the coil sections respectively associated therewith, only sufficient space being provided between coil section and the parts of the core to permit adequate electrical insulation of the windings and a reasonable ease in constructing the transformer. A minimum of mutual reactance between the various secondary winding coil sections assures independent operation of the individual loads, especially important in the operation of a plurality of luminescent tubes or gaseous conduction devices.

As the current flowing in the circuit including tube 12 tends to increase and reach an objectionably high value, a magneto-motive force is produced by this current which tends to increase and oppose the course of the magnetic flux (caused by the primary magneto-motive force resulting from the flow of current through the transformer primary winding 16) through that section of the magnetic core 22 linking the transformer secondary winding coil section 20. Due to this opposing force the magnetic flux tends to course through the auxiliary core section 35 and the included air gap, directly detracting from the magnetic flux coursing through coil section 20 and interlinking the primary winding 16 with the secondary winding coil section 20. As a result, the potential induced in coil section 20 is greatly decreased, thus decreasing the sum of the potentials induced in coil sections 17 and 20 which is impressed across the terminals of the luminescent tube 12.

The change in the course of the magnetic flux around transformer secondary winding coil section 20 has but relatively little effect upon the magnetic flux linking primary coil winding 16 and secondary winding coil sections 17, 18, 19, 20 and 21. Under the action of the continuously increasing magnetic flux (the magnetic flux increases with the primary magneto-motive force as the alternating current electrical energy supplied primary winding 16 continues in its rising cycle) coursing through core 22 and interlinking the primary winding with the several secondary winding coil sections, as indicated, the induced potentials in the common secondary winding coil section 17 and the individual coil sections 18, 19, 20 and 21 continue to increase.

The continuously rising transformer secondary output potentials appearing across the output terminal conductors 24—29, 24—30, 24—31 and 24—32 quickly reach the striking potentials of the remaining devices or tubes 10, 11 and 13 respectively connected to these conductors. The luminescent tube 10, having a striking or ionizing potential immediately above that of tube 12 of lowest value, as indicated above, is the second one to become ionized. Upon ionization of the gas column of tube 10 this tube becomes a relatively good conductor of electricity and a current immediately tends to flow in the electrical circuit including tube 10 and secondary winding coil sections 17 and 18 which may be traced for example, from coil 17, coil end 17*a* and conductors 24 and 25 to the luminescent tube 10 and from this tube by way of conductor 29, coil end 18*b*, coil 18, coil end 18*a*, conductor 23 and coil end 17*b* back to coil 17. As more particularly described above in connection with the description of electrical circuit conditions attendant the ionization of tube 12, a magneto-motive force opposing the coursing of the main magnetic flux interlinking primary winding 16 and secondary winding coil section 18 is established. This causes a heavy magnetic flux to course through the auxiliary core section 36 mounted on core 22 embracing coil section 18 (and the included air gap between core 22 and one end 36*a* of this auxiliary core or shunt section) and that portion of the core 22 linking coil 18, forming a complete closed auxiliary magnetic circuit. With the establishment of the auxiliary magnetic circuit a very high back electro-motive force is induced in coil section 18 which directly opposes the electromotive forces induced in coil sections 17 and 18 resulting from the changing magnetic flux interlinking secondary coil sections 17 and 18 with primary winding 16. This back E. M. F. is sufficient to limit the rise of current in tube 10 to desired values; a further limitation of current being achieved, to a minor extent, by the back E. M. F. induced in coil section 17, as more particularly described above.

The opposing action of the magneto-motive force produced by the rising current in coil section 18 furthermore causes the major portion of the main magnetic flux coursing through core 22 to pass along the auxiliary magnetic circuit afforded by auxiliary core section 36 and the included air gap, thus directly detracting from the total magnetic flux interlinking primary winding 16 and secondary winding coil section 18, and accordingly reducing the direct electro-motive force induced in coil 18 and decreasing the sum of the direct induced potentials of coils 17 and 18 applied across the terminals of tube 10. This further decreased instantaneous value of the applied potential is further effective in preventing the current flowing in the circuit including tube 10 from rising to excessively high values. The resultant applied potential, however, is sufficient to maintain the tube in an ionized condition.

Upon further increase in the main magnetic flux interlinking primary winding 16 and secondary winding coil sections 17, 18, 19, 20 and 21 incident to the increased primary magneto-motive force as the applied alternating current electrical energy continues to increase in its rising cycle, the potentials induced in secondary winding coil sections 17—19 and 17—21 continue to increase. The values of the striking potentials of devices or tubes 11 and 13 are successively reached in a manner more particularly described above, causing an ionized and conductive condition of the tubes to be successively established permitting the flow of electrical current in the circuits including these tubes; the flow of current being limited by the high back E. M. F. induced in the respective coil sections 19 and 21 embraced by respective auxiliary core sections 37 and 38 mounted on the main core 22, as well as to a minor extent by the self-induced back E. M. F. in the common coil section 17 and the reduction in the direct E. M. F. induced in the respective coil sections 19 and 21, resulting from the decrease in magnetic flux interlinking coil sections 19 and 21 with primary winding 16 incident to the coursing of the main magnetic flux through the auxiliary core sections 37 and 38 in a manner more particularly described in connection with the successive starting of luminescent tubes 12 and 10.

A further limitation upon the instantaneous value of the potential directly induced in coil sections 17—18, 17—19, 17—20 and 17—21 and applied across the terminals of the respective luminescent tubes 10, 11, 12 and 13, is achieved where desired by including an auxiliary core shunt Search Ro section 39 about the transformer primary winding 16. Auxiliary core section 39 is mounted in any suitable fashion on the main core 22, preferably providing, however, a short air gap between one end 39a of the auxiliary core and the main core. As the luminescent tubes 12, 10, 11 and 13 become successively ionized and conductive the total transformer secondary output current (the sum of the currents flowing in the circuits including coil sections 17—18, 17—19, 17—20 and 17—21) and the total magneto-motive force opposing the increase of the magnetic flux interlinking primary winding 16 and the various secondary winding coil sections tend to rapidly increase to high values which tend to occasion a high instantaneous value of current supplied primary winding 16 by source 14 and a greatly increased magneto-motive force in transformer primary winding 16.

The tendency for a current of high instantaneous value to flow in primary winding 16 and develop a correspondingly high magneto-motive force under the action of the applied potential increasing in its cycle of operation, is offset by the back E. M. F. induced in this winding (resulting from the initial increases in current) opposing the applied E. M. F. Because of the auxiliary magnetic path interlinking primary winding 16 (this magnetic path including auxiliary core section 39, air gap 39a—22 and the portion of core section 22 immediately linking winding 16) an auxiliary magnetic flux of considerable proportions is established upon an initial flow of current in winding 16 causing the production of an induced back E. M. F. of relatively great magnitude opposing the applied E. M. F. thereby limiting the flow of current in the primary winding, the magnetic flux interlinking primary and secondary windings, the potentials induced in the secondary windings, and the secondary output current, as more fully indicated above.

The extent of the influence of these various factors limiting and controlling the flow of current in the various luminescent tubes or devices having negative resistance characteristics, as discussed above, is so proportioned as to give uniform and brilliant operation of the tubes, as by properly proportioning the relative sectional areas of main core 22 and auxiliary cores 35, 36, 37 and 38, as well as by employing core sections of such sectional areas to obtain desired magnetic flux densities and by employing desired lengths of air gaps serially included with these auxiliary cores. Ordinarily these adjustments are arrived at empirically.

When all of the tubes are in the ionized conductive condition giving forth a brilliant, luminous glow of a configuration conforming to the arrangement of tubes comprising the sign or display 10—11—12—13, this luminescent condition persists throughout the further progress of the applied alternating current electrical energy in its assumed half cycle of operation. The tubes remain conductive and luminous until the instantaneous value of the secondary output potential applied the tube of maximum required sustaining potential (assuming the tube of highest required striking potential also has the highest required sustaining potential), illustratively 13, falls to this particular value. When this value is reached the ionized condition of the column of gas of the tube is no longer maintained, the tube then becoming un-ionized and non-conductive and non-luminous. The remaining luminescent tubes 11, 10 and 12 become successively un-ionized, non-conductive and non-luminous.

As the applied alternating current electrical energy continues through its cycle of alternations, a potential of sufficient value is soon applied across the terminals of luminescent tube 12 to ionize the gas column of this tube and render it conductive and luminous, thus repeating the operating condition described above. As the cycle progresses tubes 10, 11 and 13 are successively rendered conductive and luminous. Further progress of the cycle of operation renders all tubes un-ionized and non-luminous.

The several luminescent tubes are rendered luminous and non-luminous once for each half cycle of the alternations of the alternating current electrical energy source of supply. For a 60 cycle supply of alternating current electrical energy the tubes are thus rendered alternatively conductive and non-conductive and consequently luminous and non-luminous 120 times a second. Due to persistence of vision the tubes appear to glow continuously.

Because of the manner in which luminescent tubes of the character indicated or like devices of negative electrical resistance characteristics become conductive and non-conductive almost instantaneously, a transient wave of potential and current is set up on the various conductors connecting the several tubes to the high potential transformer apparatus. The provision of auxiliary magnetic core sections embracing the several individual transformer secondary winding coil sections of the transformer apparatus lends each coil section such relatively high values of conductance under load as to materially increase the free periods of these transient manifestations and to effectively damp them to minimize variations in current densities and hence variations in luminescence in the several individual tubes and also minimize disturbing electro-magnetic radiations of a radio frequency range.

Where there is considerable difference between the physical dimensions of the several luminescent tubes employed, as for example where the lengths of the various tubes differ considerably, the relative duration of the luminous periods of the several tubes (in general the tube first rendered luminous is last rendered non-luminous, and the tube last rendered luminous is the tube first rendered non-luminous, permitting a double divergence in the luminescent periods of any two tubes) may differ so widely where transformer apparatus including secondary winding coil sections of the same size and voltage ratings are employed as to give an unbalanced luminous appearance, the several individual secondary winding coil sections connected to each of the luminescent tubes may be proportioned in voltage rating so that the coil section of highest voltage rating is connected to the tube of highest striking potential and the remaining tubes correspondingly connected to coil sections of proportionately decreased voltage ratings. With the several individual secondary winding coil sections proportionately rated to correspond to the striking potentials of the several luminescent tubes, all of the tubes will be rendered ionized, conductive and luminous at substantially the same instant and subsequently rendered un-ionized, non-conductive and non-luminous at a subsequent instant giving a luminous period for all tubes of about the same duration.

Where a number of luminescent tubes of considerably different current ratings (tubes containing different gases at different pressures or tubes of different diameters) are employed comprising a single luminous display, it is desirable to supply certain of the tubes with a greater current than the others in order to preserve a substantial uniform current density, and hence a substantially uniform luminescence in the several tubes employed. Thus, referring to Figure 2 a plurality of tubes 40, 41, 42 and 43 of substantially like striking potential and required sustaining potential characteristics but of different current carrying capacities, comprising a single display 40—41—42—43 are respectively connected by way of conductors 44, 45, 46 and 47 to one end of each of transformer secondary winding coil sections 48, 49, 50 and 51 mounted on a common core 52. Tubes 40, 41, 42 and 43 are likewise connected by the respective conductors 53, 54, 55 and 56 and the common conductor 57 to one end of a common transformer secondary winding coil section 58, the other end of which is connected to a conductor 59 connecting the free ends of coil sections 48, 49, 50 and 51 with the free end of coil section 58, establishing a point of common potential and placing coil sections 48, 49, 50 and 51 in like phase sequence and coil section 58 in opposite phase sequence, all as more particularly described above in connection with the system and apparatus shown in Figure 1. Conveniently conductor 59 is connected to core 52 by way of a suitable conductor 159. The core is connected to ground as shown at 152 giving a balanced transformer with a potential across the terminals of secondary coil sections of about twice that of the potential to ground, as more particularly indicated above in describing the system and apparatus illustrated in Figure 1.

Transformer core 52 is energized by transformer primary winding 60 mounted on core 52 and supplied with alternating current electrical energy from a single phase source of supply 61 connected to winding 60 by way of conductors 62 and 63.

In the operation of the system shown in Figure 2, the current permitted to flow in each of the transformer secondary output circuits including the several luminescent tubes is limited in a manner more particularly described above, by auxiliary magnetic circuits linking the individual transformer secondary winding coil sections. The magnetic paths for the auxiliary magnetic circuits linking the individual coil sections are provided by the respective auxiliary core sections 64, 65, 66 and 67, suitably mounted on core 52, embracing coil sections 48, 49, 50 and 51. In order that sufficient current may be permitted to flow in the tubes of maximum current carrying capacities, illustratively luminescent tubes 41 and 43 of increased tube diameters, full potential is desirably induced in transformer secondary winding coil section 58 which is common to all tubes. To achieve the full current limiting inductance effect of the transformer primary winding on the current flowing in the several luminescent tubes after the conductive conditions of these tubes have been established, and to furthermore realize a reduction in the magnetic flux interlinking the transformer primary winding and the transformer winding individual coil sections, an auxiliary shunt magnetic circuit is provided around the transformer primary winding by way of an auxiliary core section 68, suitably mounted on core 52. In order that full potential may be induced in the common secondary coil section 58, as indicated above auxiliary core section 68 is positioned to embrace both primary winding 60 and secondary winding coil section 58. Maximum magnetic linkage between primary winding 60 and secondary winding coil section 58, and thus a maximum induced potential in coil section 58, is assured in a simple, efficient and reliable manner.

Improved operational conditions of my system and apparatus, especially in the matter of power factor (a feature of considerable commercial importance), is achieved by omitting the auxiliary core section embracing transformer primary winding of my apparatus and substantially divorcing the auxiliary core sections individual to the transformer secondary winding coil sections connected to individual luminescent tubes, from the main transformer core interlinking the primary winding with the several transformer secondary winding coil sections in order to substantially reduce the tendency toward the production of conflicting magnetic fields within the main transformer core and the consequent electrical eddy currents resulting in objectionable core heating and high core losses.

Thus, referring to Figure 3 of the drawings, a transformer primary winding 70 supplied with alternating current electrical energy from an available source 71 and connected thereto by way of conductors 72 and 73, is mounted on a magnetic core 74 in any suitable manner. Transformer winding coil sections 75, 76, 77, 78 and 79 are likewise mounted on core 74. One end of each of the secondary winding coil sections is connected to a common conductor 80 establishing a point of common potential therefor and connecting one of the coil sections 75 in phase opposition to the remaining coil sections 76, 77, 78 and 79. Conductor 80 is conveniently grounded as at 81 giving a symmetrical or balanced electrical system and establishing a maximum potential to ground for the system equal to the potential induced in the secondary winding coil section of maximum voltage rating.

A number of luminescent gas-filled tubes 82, 83, 84 and 85 are respectively connected by way of conductors 86, 87, 88 and 89 to a common conductor 90, connected to the free end of transformer secondary winding coil section 75 of opposed phase sequence. These several gas-filled tubes are also connected by way of conductors 91, 92, 93 and 94 to the free ends of the respective individual transformer secondary winding coil sections 76, 77, 78 and 79 of like phase sequence.

In the operation of this modification of my system and apparatus, the instantaneous current supplied luminescent tubes 82, 83, 84 and 85 when these tubes are rendered conductive, as more particularly described above in connection with the operation of the system shown in Figure 1 of the drawings, is greatly limited by the inductive reactance of the coil sections, included in the circuits of these tubes. This limiting inductive effect is greatly increased because of the individual magnetic circuits interlinking the several transformer secondary winding coil sections.

Individual auxiliary core shunt sections 95, 96, 97 and 98 forming complete magnetic circuits respectively interlinking individual coil sections 76, 77, 78 and 79, are mounted on the main core 74 in any suitable manner to provide a small air gap between the auxiliary core sections and the main transformer core and electrically insulate the several auxiliary core sections therefrom. Conveniently, auxiliary core sections 95, 96, 97 and 98 are spaced and electrically insulated from core 74 by the respective strips of electrical insulation 99, 100, 101 and 102 interposed between the several auxiliary core sections and the main core.

As the current tends to rise in the several individual transformer secondary winding coil sections 76, 77, 78 and 79, as the respective luminescent tubes 82, 83, 84 and 85 connected to these coil sections are rendered conductive, a high back E. M. F. is induced opposing the direct induced E. M. F. The flow of current in the individual tubes is thus individually controlled and limited to a desired value. The relative sectional areas and permeabilities of the auxiliary core sections and main core, as well as the air gaps between the two, largely determine the controlling and limiting effect upon the current.

The use of completely closed auxiliary core sections interlinking individual transformer secondary winding coil sections furthermore improves the operating power factor and efficiency of the system and apparatus and in addition further decreases the percentage variation in the transient current and potential incident to the sudden rendering of the tubes alternately conductive and non-conductive, as more particularly described above, thus maintaining more uniform brilliant illumination of the luminescent tubes and a reduction in the electromagnetic energy radiated from the system as well.

Where desired the current supplied luminescent tubes 82, 83, 84 and 85 (see Figure 4) may be uniformly controlled and limited by an auxiliary magnetic circuit 103, interlinking the transformer secondary winding coil section 75 in addition to the individual controlling and limiting effects of individual auxiliary core sections 95, 96, 97 and 98 of respective individual coil sections 76, 77, 78 and 79. The auxiliary core section 103 is mounted on the main transformer core 74 in any suitable manner with a strip of electrical insulation 104, interposed between the main core and the auxiliary core. With this construction the auxiliary core sections 95, 96, 97 and 98 individually interlinking the respective coil sections 76, 77, 78 and 79 may be of a reduced sectional area as compared with like auxiliary core sections described above in connection with Figure 3 of the drawings. The relative sectional areas and permeabilities of these auxiliary core sections and the main transformer core are such, however, as to permit an efficient individual control of current supplied luminescent tubes 82, 83, 84 and 85 in order that all of the tubes may be properly operated in spite of slight variations in the striking potentials of the several tubes. Such a construction permits certain economies in manufacture, operation and maintenance.

The specific embodiment of my transformer illustrated in Figure 4 is especially reliable under the various conditions of load, overload and short-circuit encountered in actual use. When, for example, a short-circuit occurs across terminal conductors 86 and 91 supplying electrical energy to tube 82, the auxiliary magnetic core shunt sections 103 and 95 respectively control and limit the flow of current in coil sections 75 and 76 to safe values in a manner more particularly described above in connection with the operation of the embodiments illustrated in Figures 1 and 3. The amount of current flowing in these coil sections under short-circuit conditions is about the same as that flowing during the conduction periods of the tube and may be safely withstood by the coil sections without overheating and consequent damage.

Similarly, when a short-circuit occurs across 86 and 80 (or 86 and ground 81) the outwardly extending legs 103*a* and 103*b* and the outermost section 103*c* of auxiliary magnetic core shunt section 103 provides a magnetic path around secondary winding coil section 75. The main magnetic flux, then, which under open-circuit conditions of this coil section ordinarily traverses the portion of core 74 linking this coil section, is shunted around the coil section along the path 103*a*, 103*c*, 103*b* of auxiliary core section 103 of the large back magneto-motive force induced in coil section 75 by the flow of short-circuit current in this section. The flow of current in coil section 75 is then limited to a safe value.

In like manner, when a short-circuit occurs across the terminal conductors of any one of coil sections 76, 77, 78 or 79 the flow of excess current in these sections is prevented by the production of a high back magneto-motive force by the short-circuit current. This back magneto-motive force opposes the coursing of flux along a path threading the coil section and thereby causes the flux to course around the coil section by way of the shunt path provided by auxiliary core shunt sections 95, 96, 97, and 98 respectively. The electro-motive force induced in the coil section by the main flux linking the coil section is insufficent to cause the flow in this section of a current of damaging properties.

A convenient form of construction of my transformer apparatus is indicated in Figure 5, wherein the primary coil section 70 is mounted on one leg 74*a* of a closed magnetic core 74. Conveniently, the one secondary winding coil section of opposed phase sequence 75 is mounted on an opposite core leg 74*b*. Individual transformer secondary winding coil sections 76 and 77 are conveniently mounted on core leg 74*c* while individual core sections 78 and 79 are symmetrically positioned on the opposite core leg 74*d*.

Auxiliary core sections 95 and 96 respectively linking individual coil sections 76 and 77 (see also Figure 6) are rigidly mounted on core leg 74*c* in any suitable manner. Spacing between auxiliary core sections 95—96 and core leg 74*c* is achieved by way of a flat strip of electrical insulating material 99—100, such as press board. Similarly, auxiliary core sections 97 and 98 respectively interlinking coil sections 78 and 79 are mounted on core leg 74*d* with a strip of electrical insulating material 101—102 intervening.

Terminal connections from the primary winding are brought out from coil 70 as 70*a* and 70*b*. Terminal connections for the several secondary winding coil sections 75, 76, 77, 78 and 79 are respectively brought out as at 75*b*, 76*a*, 77*a*, 78*a* and 79*a*, while the coil ends 75*a*, 76*b*, 77*b*, 78*b* and 79*b* are conveniently brought out and grounded to core 74 to establish a point of common potential and place coil section 75 in phase opposition to the remaining coil sections, as more fully described above.

This construction provides a simple, compact and inexpensive transformer apparatus for operating a number of luminescent tubes or other devices having negative electrical resistance characteristics in a highly efficient and thoroughly reliable manner. The transformer apparatus furthermore lends itself to an ease of handling in packing and shipping and a sureness and simplicity in installation permitting many practical savings and economies.

While in the above illustrative embodiments of my invention, systems and apparatus for the operation of four luminescent tubes are illustratively described, it will be understood that any number of individual luminescent tubes may be individually operated and controlled from a single source of alternating current electrical energy, by employing transformer apparatus having individual secondary winding coil sections one more in number than the luminescent tubes to be energized.

Thus it will be seen that there has been provided in this invention a system and apparatus in which the various objects hereinbefore set forth, together with many thoroughly practical advantages are successfully achieved.

It will be seen that the system and apparatus are well adapted to operate a plurality of individual loads with reliability and efficiency and furthermore that the transformer apparatus is particularly designed for balanced, uniform operation under the many varying conditions encountered in actual use.

As many possible embodiments may be made of my invention and as many changes may be made in the embodiments hereinbefore set forth, it will be understood that all matter described herein or shown in the accompanying drawings is to be interpreted as illustrative, and not in a limiting sense.

I claim:

1. In single phase electrical systems of the character described, in combination, a source of single phase alternating current electrical energy, a single phase electrical transformer having a primary winding and a secondary winding comprising a plurality of coil sections mounted on a common interlinking core, means connecting said transformer primary winding to said source, conductor means interconnecting said transformer secondary winding coil sections placing one of said coil sections in phase opposition to the remaining coil sections, a plurality of devices having negative electrical resistance characteristics corresponding in number to said transformer secondary winding coil sections of like phase sequence, conductor means connecting said transformer secondary winding coil sections of opposing phase sequence to said devices, conductor means respectively connecting said transformer secondary winding coil sections of like phase sequence to said corresponding devices, and means operatively associated with said transformer core for diverting a portion of the magnetic flux interlinking said transformer primary and secondary winding coil sections in accordance with variations in the electrical characteristics of each of said devices.

2. In single phase electrical systems of the character described, in combination, a source of single phase alternating current electrical energy, a single phase electrical transformer having a primary winding and a secondary winding comprising a plurality of individual coil sections mounted on a common interlinking core, means connecting said transformer primary winding to said source, conductor means interconnecting said transformer secondary winding coil sections placing one of said coil sections in phase opposition to the remaining coil sections, a plurality of devices having negative electrical resistance characteristics corresponding in number to said transformer secondary winding coil sections of like phase sequence, conductor means connecting said transformer secondary winding coil sections of opposing phase sequence to said devices, conductor means respectively connecting said transformer secondary winding coil sections of like phase sequence to said corresponding devices, and a plurality of individual core means respectively interlinking said individual transformer secondary winding coil sections for increasing the inductive reactance of said coil sections, thereby controlling the flow of transformer secondary currents to said corresponding devices in accordance with alterations in the electrical characteristics of each of said devices.

3. In single phase electrical systems of the character described, in combination a source of single phase alternating current electrical energy, a single phase electrical transformer having a primary winding and a secondary winding comprising a plurality of coil sections mounted on a common interlinking core, means connecting said transformer primary winding to said source, conductor means interconnecting said transformer secondary winding coil sections placing one of said coil sections in phase opposition to another of said coil sections, a device having negative electrical resistance characteristics, conductor means connecting one of said transformer secondary winding coil sections to one end of said device, conductor means connecting another of said transformer secondary winding coil sections to the opposite end of said device, and core means interlinking one of said transformer secondary winding coil sections for increasing the inductive reactance of said coil section and thereby controlling the flow of transformer secondary current to said device in accordance with variations in the electrical characteristics of the device.

4. In electrical transformer apparatus of the class described, in combination, a transformer core, a primary winding linking said core, a secondary winding having a multiplicity of coil sections linking said core common to said primary winding, conductor means interconnecting one end of each of said secondary winding coil sections establishing a point of common potential therefor and placing one of said sections in phase opposition to the remaining sections, conductor means connected to the other end of said coil section connected in phase opposition for connection with one side of a plurality of individual loads, individual conductor means connected to the other ends of said coil sections of like phase sequence for connecting said sections to the opposite side of said individual loads, and means operatively associated with said transformer core for diverting a portion of the magnetic flux interlinking said transformer primary and secondary winding coil sections in accordance with fluctuations in said loads.

5. In electrical transformer apparatus of the class described, in combination, a transformer core, a primary winding linking said core, a secondary winding having a multiplicity of coil sections linking said core, conductor means interconnecting one end of each of said secondary winding coil sections establishing a point of common potential therefor and placing one of said sections in phase opposition to the remaining sections, conductor means connected to the other end of said coil section connected in phase opposition for connection with one side of a plurality of individual loads, individual conductor means connected to the other ends of said coil sections of like phase sequence for connecting said sec- Search R tions to the opposite side of said individual loads, and a plurality of auxiliary magnetic core sections corresponding to said coil sections of like phase sequence operatively associated with said transformer core respectively embracing each of said coil sections for individually controlling the inductive reactance of each of said coil sections in accordance with individual fluctuations in said loads.

6. In electrical transformer apparatus of the class described, in combination, a transformer core, a primary winding linking said core, a secondary winding having a multiplicity of coil sections linking said core, conductor means interconnecting one end of each of said secondary winding coil sections establishing a point of common potential therefor and placing one of said sections in phase opposition to the remaining sections, conductor means connected to the other end of said coil section connected in phase opposition for connection with one side of a plurality of individual loads, individual conductor means connected to the other ends of said coil sections of like phase sequence for connecting said sections to the opposite side of said individual loads, magnetic core shunt means interposed between said transformer primary winding and said transformer secondary winding for uniformly altering the magnetic flux interlinking said primary and secondary windings in accordance with fluctuations in said loads, and a plurality of auxiliary magnetic core sections corresponding to said coil sections of like phase sequence operatively associated with said transformer core respectively embracing each of said coil sections for individually controlling the inductive reactance of each of said coil sections in accordance with individual fluctuations in said loads.

7. In electrical transformer apparatus of the class described, in combination, a transformer core, a primary winding linking said core, a secondary winding having a multiplicity of coil sections linking said core, conductor means interconnecting one end of each of said secondary winding coil sections establishing a point of common potential therefor and placing one of said sections in phase opposition to the remaining sections, conductor means connected to the other end of said coil section connected in phase opposition for connection with one side of a plurality of individual loads, individual conductor means connected to the other ends of said coil sections of like phase sequence for connecting said sections to the opposite side of said individual loads, magnetic core shunt means embracing said transformer primary winding and said transformer secondary winding coil section of opposed phase sequence for maintaining a relatively high magnetic flux linkage between said primary winding and said secondary winding coil section of opposed phase sequence in spite of fluctuations in said loads, and a plurality of auxiliary magnetic core sections corresponding to said coil sections of like phase sequence operatively associated with said transformer core respectively embracing each of said coil sections for individually controlling the inductive reactance of each of said coil sections in accordance with individual fluctuations in said loads.

8. In electrical transformer apparatus of the class described, in combination, a transformer core, a primary winding linking said core, a secondary winding having a multiplicity of coil section linking said core, conductor means interconnecting one end of each of said secondary winding coil sections establishing a point of common potential therefor and placing one of said sections in phase opposition to the remaining sections, conductor means connected to the other end of said coil section connected in phase opposition for connection with one side of a plurality of individual loads, individual conductor means connected to the other ends of said coil sections of like phase sequence for connecting said sections to the opposite side of said individual loads, auxiliary magnetic core means interlinking said secondary winding coil section of opposed phase sequence for controlling the inductive reactance of said coil section in accordance with collective fluctuations in said loads, and a plurality of auxiliary magnetic core sections corresponding to said coil sections of like phase sequence operatively associated with said transformer core respectively embracing each of said coil sections for individually controlling the inductive reactance of each of said coil sections in accordance with individual fluctuations in said loads.

9. In electrical transformer apparatus of the class described, in combination, a transformer core, a primary winding linking said core, a secondary winding having a multiplicity of coil sections linking said core, conductor means interconnecting one end of each of said secondary winding coil sections establishing a point of common potential therefor and placing one of said sections in phase opposition to the remaining sections, conductor means connected to the other end of said coil section connected in phase opposition for connection with one side of a plurality of individual loads, individual conductor means connected to the other ends of said coil sections of like phase sequence for connecting said sections to the opposite side of said individual loads, and a plurality of auxiliary magnetic cores corresponding to said secondary winding coil sections of like phase sequence spaced from said transformer core and electrically insulated therefrom respectively interlinking said coil sections for controlling the inductive reactance of said sections in accordance with fluctuations in said loads.

10. In single phase electrical systems of the character described, in combination, a source of single phase alternating current electrical energy, a transformer having a primary winding and a secondary winding comprising a plurality of individual coil sections mounted on a common section of transformer core, means connecting the primary winding of said transformer to said source, conductor means interconnecting one end of each of said transformer secondary winding coil sections placing one of said coil sections in phase opposition to said remaining coil sections, a plurality of devices having negative electrical resistance characteristics corresponding to the number of said coil sections of like phase sequence, conductor means connecting the other end of said transformer secondary winding coil sections connected in phase opposition to one end of each of said devices, and conductor means connecting the opposite ends of said respective devices to the other ends of said transformer secondary winding coil sections of like phase sequence.

11. In electrical transformer apparatus of the class described, in combination, a transformer core, a primary winding mounted on said core, a multiplicity of secondary winding coil sections mounted on a common section of said transformer core, conductor means interconnecting one end of each of said secondary winding coil sections establishing a point of common potential therefor and placing one of said sections in phase opposition to the remaining sections, conductor means connected to the other end of said coil section connected in phase opposition for connection with one side of a plurality of individual loads, and individual conductor means connected to the other ends of said coil sections of like phase sequence for connecting said sections to the opposite side of said individual loads.

12. In electrical transformer apparatus of the class described, in combination, a transformer core, a primary winding linking said core, and a secondary winding having a plurality of coil sections linking said core, said core including a plurality of means extending at least half-way around a plurality of said secondary winding coil sections and with portions of said core substantially completely and exclusively linking the adjacent one of said coil sections to provide a path for leakage flux around said coil sections under closed-circuit operation of said coil sections.

13. In electrical transformer apparatus of the class described, in combination a transformer core, a primary winding linking said core, and a secondary winding having a plurality of coil sections linking said core, said core including means at least half-way linking one of said coil sections and together with a portion of said core substantially completely and exclusively linking said coil section to provide a path for leakage magnetic flux around said coil section under closed-circuit operation of the transformer.

14. In electrical transformer apparatus of the class described, in combination, a transformer core, a primary winding linking said core, and a secondary winding having a plurality of coil sections linking said core, said core having a portion including a C-shaped part partially linking only a single coil section in intimate relation therewith giving a compact structure and providing a shunt path for magnetic flux around said coil section under closed-circuit operation of the transformer.

15. In electrical transformer apparatus of the class described, in combination, a transformer core, a primary winding linking said core, a secondary winding having a plurality of coil sections linking said core, and conductor means connecting at least one of said coil sections in phase opposition with another of said sections, said transformer core including shunt means at least half-way linking one of said coil sections connected in phase opposition and providing a path for leakage magnetic flux around said coil section under closed-circuit operation of the transformer.

16. In electrical transformer apparatus of the class described, in combination, a transformer core, a primary winding linking said core, a secondary winding having a plurality of coil sections linking said core, and conductor means connecting at least one of said coil sections in phase opposition with another of said sections, said transformer core having a portion including a C-shaped part partially linking only one of said coil sections connected in phase opposition giving a compact transformer construction and providing a shunt path for magnetic flux around said coil section under closed-circuit operation of said transformer apparatus.

17. In electrical transformer apparatus of the class described, in combination, a transformer core, a primary winding linking said core, a secondary winding having a plurality of coil sections linking said core, conductor means connecting at least one of said coil sections in phase opposition with another of said sections, and conductor means connecting said transformer core to the mid-point of said two coil sections placed in phase opposition to assure balanced operation of said coil sections under various conditions of operation of said apparatus, said transformer core including shunt means at least half-way linking one of said coil sections connected in phase opposition and providing a path for leakage magnetic flux around said coil section under closed-circuit operation of the transformer.

18. In electrical transformer apparatus of the class described, in combination, a transformer core, a primary winding linking said core, a secondary winding having a plurality of coil sections linking said core, conductor means connecting at least one of said coil sections in phase opposition with another of said sections, and conductor means connecting said transformer core to the mid-point of said two coil sections placed in phase opposition to assure balanced operation of said coil sections under various conditions of operation of said apparatus, said core having a portion including a C-shaped part partially linking only a single coil section in intimate relation therewith giving a compact structure and providing a shunt path for magnetic flux around said coil section under closed-circuit operation of the transformer.

CHARLES P. BOUCHER.